H. C. BERRY AND G. APPLEGATE.
AUTOMATIC ADJUSTMENT FOR BRAKE SHOES.
APPLICATION FILED FEB. 18, 1921.
1,407,628.
Patented Feb. 21, 1922.
4 SHEETS—SHEET 3.
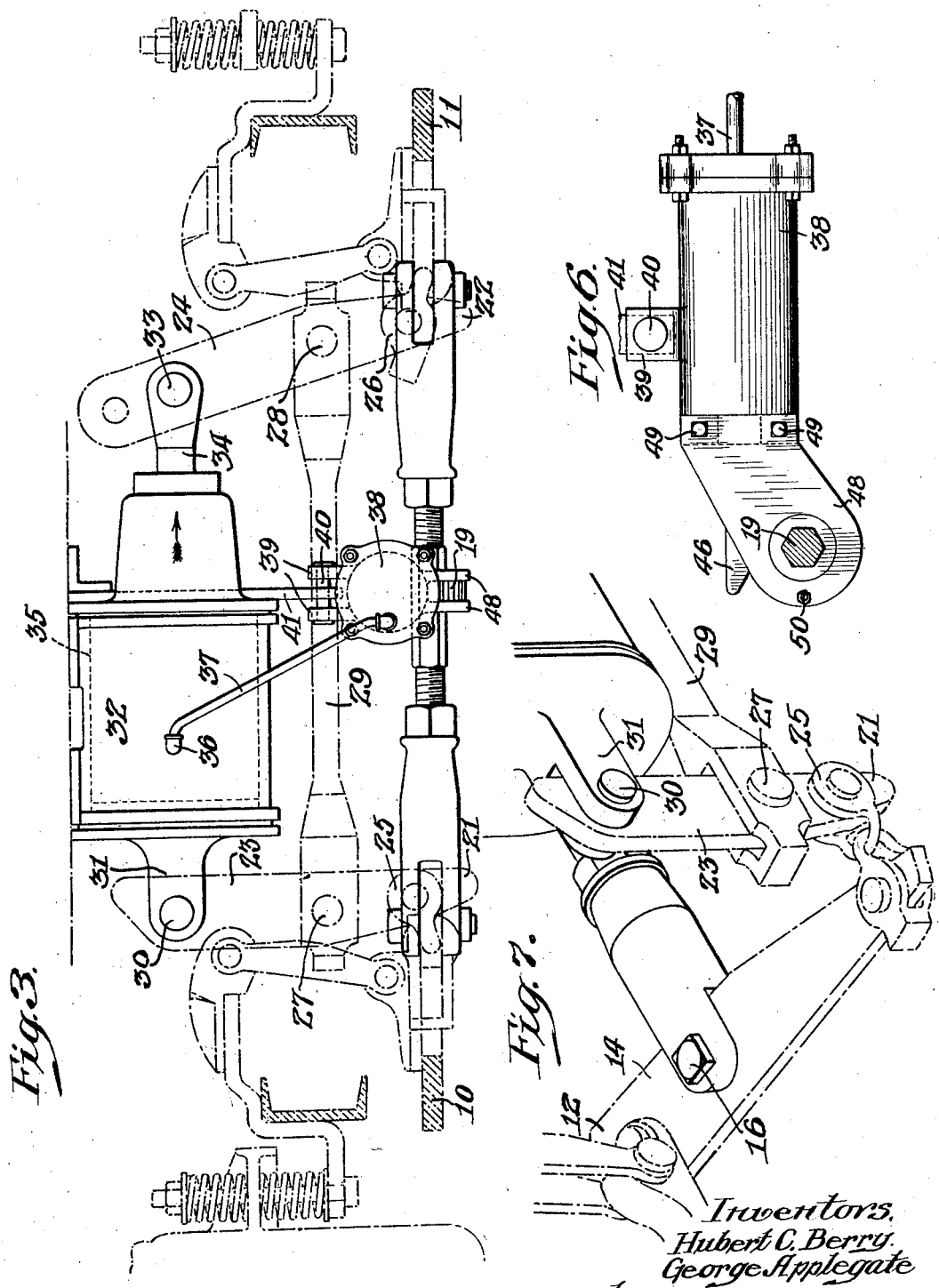

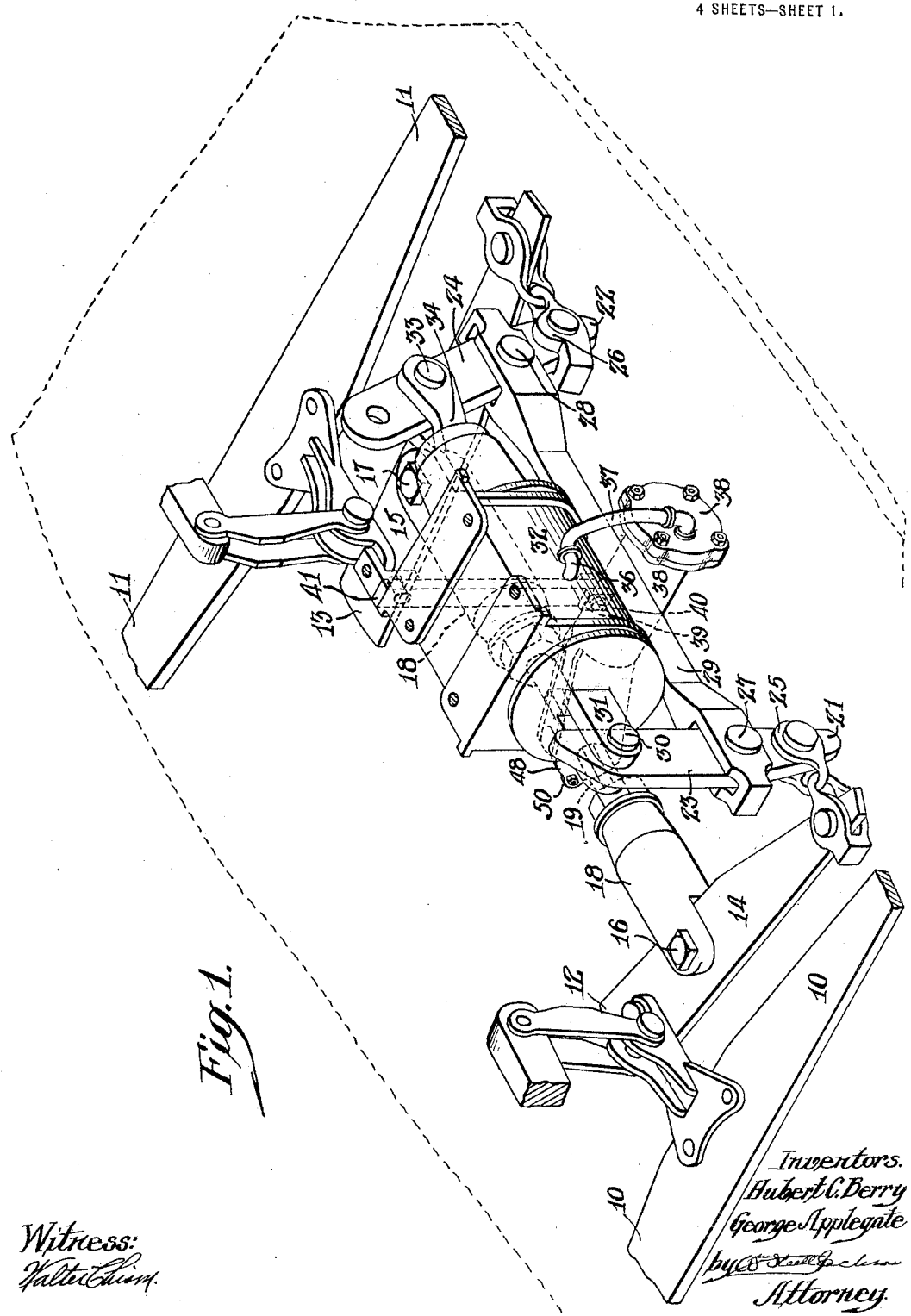

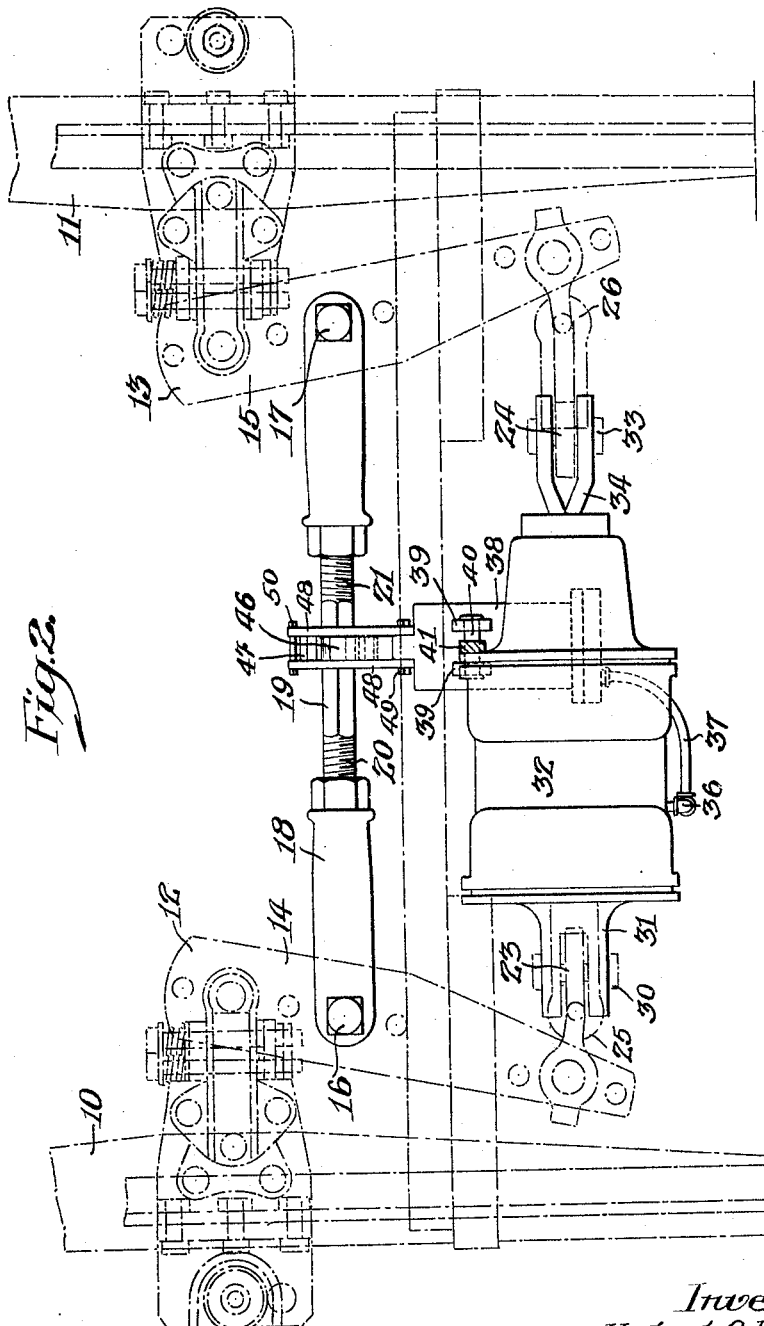

H. C. BERRY AND G. APPLEGATE.
AUTOMATIC ADJUSTMENT FOR BRAKE SHOES.
APPLICATION FILED FEB. 18, 1921.
1,407,628.
Patented Feb. 21, 1922.
4 SHEETS—SHEET 4.
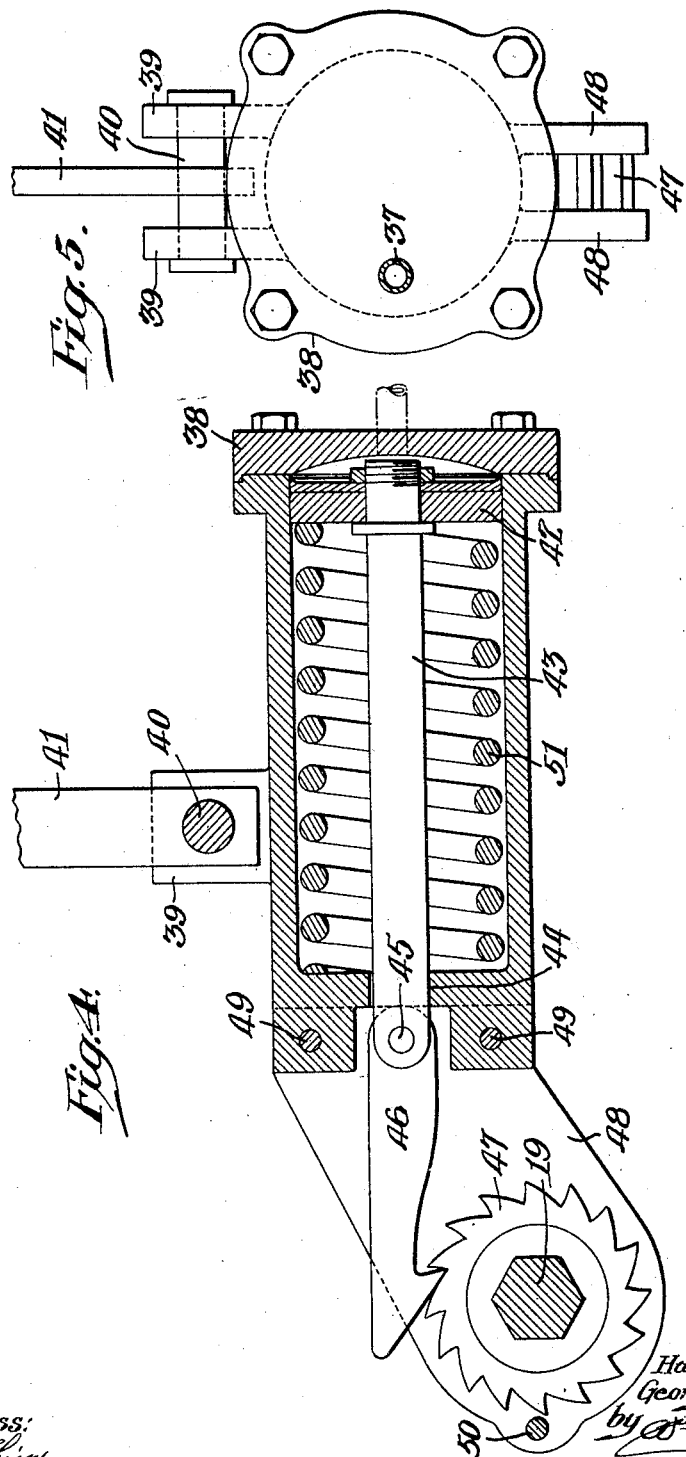

UNITED STATES PATENT OFFICE.

HUBERT C. BERRY, OF SALEM, AND GEORGE APPLEGATE, OF PENNSVILLE, NEW JERSEY, ASSIGNORS TO THE J. G. BRILL COMPANY, OF PHILADELPHIA, PENNSYLVANIA, A CORPORATION OF PENNSYLVANIA.

AUTOMATIC ADJUSTMENT FOR BRAKE SHOES.

1,407,628.      Specification of Letters Patent.      Patented Feb. 21, 1922.

Application filed February 18, 1921. Serial No. 446,015.

*To all whom it may concern:*

Be it known that we, HUBERT C. BERRY and GEORGE APPLEGATE, citizens of the United States, residing at Salem, New Jersey, and Pennsville, New Jersey, in the county of Salem and State of New Jersey, have invented a certain new and useful Automatic Adjustment for Brake Shoes, of which the following is a specification.

Our invention relates to devices for accommodating the wear of brake shoes by taking up the slack produced, so as to maintain the brake shoes in effective operative position and to avoid necessity for excessive movement of the operating mechanism.

Our invention is directed to the automatic adjustment of the fulcrums about which the truck brake levers are turned to apply the brakes.

The main purpose is to apply a take-up cylinder to a turn buckle within the tie rod connecting the two truck brake levers.

A further purpose is to place a brake take-up cylinder and its connections in the truck foundation and operate it from an air-brake operating cylinder in the car foundation.

A further purpose is to connect the take-up cylinder with the tie rod close to the ratchet wheel and to use the connection as a guard for the latch.

A further purpose is to insert a flexible connection between the brake cylinder upon the car body and the take-up cylinder in the truck foundation whereby the take-up cylinder may be given longitudinal movement with respect to the body of the car while maintaining fluid connection between.

Further purposes will appear in the specification and in the claims.

We have preferred to illustrate our invention by but one form, selecting therefor a form which in use has proved to be practical, efficient and thoroughly reliable, and which at the same time well illustrates the principles of our invention.

Figure 1 is a section, almost completely a perspective view, showing a structure embodying our invention.

Figure 2 is a partial horizontal section, largely in top plan view showing the preferred form of our invention.

Figure 3 is a side elevation of the structure seen in Figure 1.

Figure 4 is a vertical section through the take-up cylinder and turn buckle, transversely to the latter.

Figure 5 is an end elevation of the structure seen in Figure 4, the air pipe being shown in section.

Figure 6 is a side elevation of the structure seen in Figures 4 and 5, a portion of the turn buckle being in section.

Figure 7 is a perspective view of some of the connecting parts shown.

In the drawings similar numerals indicate like parts.

We have illustrated in this application the simplest form of our invention, namely the application of the invention to a car having but a single four wheel truck, eliminating as far as possible the complications present in some of the more elaborate structures.

In most of the existing constructions for automatic adjustment to take up for brake shoe wear, the adjustment has not provided for the differing angles of lever extension caused by the wear. The result has been that the brakes have not been applied as advantageously nor with as much force when the brake shoes were partly worn as when they were new. In some of the existing forms also, the adjusting mechanism has continued to adjust, even when there was not corresponding wear; with result that the brake has become so tightly set that it was necessary to send a repair crew to loosen the brake.

A part of the difficulty in previous construction has arisen from the fact that the adjustment has been attempted in the car body foundation brake rigging rather than in the truck brake foundation rigging. We have coordinated the air brake adjusting cylinder with the truck foundation brake rigging rather than with the car body foundation brake rigging and have provided a flexible connection between the main air brake cylinder and the air adjusting cylinder to take care of the relative movement between the car body foundation and the truck brake foundation.

In the single truck car, to which our invention is applied in the illustration, two brake beams 10 and 11 are shown at the left and right (Figure 2). The construction by which these brake beams are themselves supported, the mounting of the brake shoes upon them and the connections of these beams with the ends 12 and 13 of truck brake levers 14 and 15 are well known and need no description. These brake levers are fulcrumed about pins 16 and 17 at the ends of a tie rod 18, forming a truck adjusting brake rod. In this tie rod the terminals are in the form of nuts and the central portion 19 is oppositely threaded at the ends 20 and 21 to form a turn-buckle construction with a bolt turn-buckle in the middle.

To one end (the outer end) of each of the brake levers 14 and 15, we connect one end, (the lower end) 21 or 22, of an operating lever 23 or 24 by means of a clevis 25 or 26, suitably fulcruming the levers 23 and 24 by pins 27 or 28 in a rod 29. The upper end of lever 23 is pivoted at 30 to ears 31 upon a main air brake cylinder 32, while the upper end of lever 24 is pivoted at 33 to ears upon the piston rod 34 of the brake cylinder. The piston of this cylinder is adapted to open a port beneath the connection 36 when the piston stroke becomes abnormal, so as to admit operating air to the pipe 37 connecting with an automatic adjusting cylinder 38. This automatic adjusting cylinder carries ears 39 connected by a pin 40. The pin is supported by a strap 41 suitably connected with any rigid part of the structure, here shown as connected with the brake cylinder, so that movement of the pin within the strap is permitted and the automatic air brake adjusting cylinder is capable of movement transversely to its length as may be required, to accommodate relative car and truck movement.

As a car body and struck rigging are supported upon separate springs from the same truck frame and for relative movement, differing quite materially in their relative positions with different loads carried by the car and with movement of both resulting from traffic conditions, and as our air brake adjusting cylinder operates upon and is connected with the truck foundation brake rigging, whereas it receives its air from the main air brake cylinder, we provide for movement between these two cylinders.

In order to relieve against constant shock and permit this free movement of the cylinder 38, a part, at least, of the air conduit 37 is made flexible.

The take-up cylinder 38 is seen best in Figure 3. It is provided with a piston 42 and a piston rod 43 guided at the end of the cylinder at 44 and pivotally connected at 45 with a latch 46. This latch engages with a ratchet wheel 47 mounted upon the turn-buckle and is held to duty by ears 48 having bearing upon the tie rod and connecting with the cylinder by bolts 49. The ears are united beyond the tie rod by bolt 50. The sides of the ears 48 act as shrouds for the ratchet wheel to keep the latch 46 from side movement.

The piston 42 is moved forwardly in the cylinder each time that excessive movement of the piston in the brake cylinder (due to wear of the brake shoes) uncovers the port feeding pipe 36. Though it would be possible to effect the adjustment by this impulse—or pressure—of air passing through pipe 37 into cylinder 38, having the latch engage the ratchet wheel during the air-operated movement of the piston, it would be impracticable for the reason that the take-up piston would be acting upon the ratchet wheel while the brakes were applied, requiring excessive strength in this cylinder and without attaining any corresponding beneficial result. We, therefore, set the latch for action by this air-operated piston movement, and operate the latch by the return stroke of the piston caused by the retraction spring 51.

Where two trucks are used, separate turn buckles are applied for the brake system of each truck. In applying our invention, a single brake operating cylinder only would be required, but two take-up cylinders would be used, both receiving air upon exposure of a port within the brake cylinder. Since the brake cylinder piston would not move an excessive distance until the sets of brake shoes for both trucks had become worn, both of the take-up mechanisms would require operation when the brake cylinder piston moved to expose the port.

It will be evident that our disclosure herein will suggest to those skilled in the art various other ways in which all or some part of our invention may be carried out; and that in applying the invention, it will naturally be modified and changed as the needs of the particular installation or the preference of the designer may indicate. It is our purpose to include herein all such modifications and changes as fall within the reasonable spirit and scope of our invention.

Having thus described our invention, what we claim as new and desire to secure by Letters Patent is:

1. In a slack adjuster for railway car brake shoes, the combination of a pair of brake beams, a brake cylinder, operating levers connected with the brake cylinder, brake levers connected with the operating levers at one end and operatively connected with the brake beams at the other end, a tie rod connecting intermediate points of the brake levers, a turn-buckle in the tie rod, a ratchet wheel upon the turn-buckle, a spring-retracted piston, a latch carried thereby engaging with the ratchet wheel to adjust on retractive movement of the parts, a take-up cylinder for said piston having its axis transverse to the turn-buckle and fluid connections between the brake cylinder and take-up cylinder operating the piston of the latter when the piston of the brake cylinder moves beyond a predetermined point.

2. In a slack adjuster for railway car brake shoes, the combination of a pair of brake beams, a brake cylinder therefor, connections from the brake cylinder and the piston thereof to the brake beams including truck brake levers and a truck take-up turn-buckle connecting the truck brake levers, a ratchet wheel upon the turn-buckle, a latch and spring-retracted air-operated means for operating the latch on the retractive movement, circumferentially of the ratchet wheel with excessive movement of the piston of the brake cylinder.

3. In a slack adjuster for railway car brake shoes, a brake cylinder, brake beam mechanism and connections therebetween including truck brake levers and a truck take-up turn-buckle connecting the truck brake levers, in combination with a take-up cylinder having its axis transverse to the turn-buckle, fluid connections between said cylinder and the brake cylinder, opened with excessive movement of the piston of the brake cylinder, a piston in the take-up cylinder, a latch carried by the piston, spring retraction for the piston adapted to effect the adjustment, and a ratchet wheel upon the turn-buckle engaged by the latch during the retracting movement of the spring.

4. In a slack adjuster for railway car brake shoes, the combination of a brake cylinder, a piston therein, a pair of brake beams, connections between the brake beams and piston and cylinder respectively, including truck brake levers and a truck take-up turn-buckle connecting the truck brake levers, a take-up cylinder, connections for supplying air to the take-up cylinder as the stroke in the brake cylinder increases beyond a predetermined point, a piston and piston rod for the take-up cylinder operating transversely to the turn-buckle and connections between the piston rod and turn-buckle effective to adjust the brake beams during retraction of the piston of the take-up cylinder.

5. In a slack adjuster for railway car brake shoes, the combination of a brake cylinder having a piston therein and a port exposed by excessive movement of said piston, brake beams and lever connections with the cylinder and piston respectively for operating the brake beams from the cylinder, part of the connections comprising truck brake levers and a truck take-up turn-buckle connecting the truck brake levers, a take-up cylinder having its axis directed transversely to the turn-buckle, flexible inlet air connection from said port to the take-up cylinder, hanger support for the take-up cylinder permitting lateral movement thereof, a ratchet wheel on the turn-buckle and a latch connected with said wheel and operated by the piston of the take-up cylinder to rotate the ratchet wheel during retractive movement.

6. In a slack adjuster for railway car brake shoes, the combination of a pair of brake beams, a pair of brake levers operatively connected at one end of each to move said brake beams, a tie rod between intermediate portions of said levers, a turn-buckle in said tie rod, a ratchet wheel on said turn-buckle, a pair of operating levers having one end of each connected with the other ends each of the brake levers, a brake cylinder, piston and connections for throwing said operating levers, the brake cylinder having a port uncovered by excessive movement of the piston of the brake cylinder, an adjusting cylinder connected with said port and having its axis transversely directed with respect to said turn-buckle, a piston in said cylinder, spring-retraction for said piston and a latch carried by said piston to engage with the ratchet wheel to rotate said wheel during retractive movement.

7. In a slack adjuster for railway car brake shoes, the combination of a brake cylinder carried by the car body, a pair of brake beams, connections therebetween, including truck brake levers and a truck take-up turn-buckle connecting the truck-brake levers, and adjusting cylinder and connections for turning said turn-buckle, a flexible mount for said adjusting cylinder from the car body and flexible fluid connection between the adjusting cylinder and the brake cylinder.

8. In a slack adjuster for railway car brake shoes, a pair of brake beams, a pair of truck brake levers, one connected to operate each brake beam, a truck adjusting brake rod connecting the brake levers and determining and maintaining nearly the original operating angles of these levers, an air brake adjusting cylinder and piston operatively connected to adjust said rod during retractive movement of the piston, a main air brake cylinder operating the brakes, and a flexible connection between the two cylinders to operate the adjusting cylinder under predetermined conditions in the main cylinder.

9. In a slack adjuster for railway car brake shoes, a truck adjusting brake rod, truck brake levers and connections to operate the brake, an adjusting cylinder maintained in operative relation to the truck adjusting brake rod and having a piston, a rotary adjusting mechanism in the truck adjusting brake rod, adapted to be turned by retractive movement of the piston of the adjusting cylinder, a car body, a main air brake cylinder supported therefrom and having a piston, lever connections from said main air brake cylinder piston to the truck brake levers for operation of the latter, fluid connections from the main air brake cylinder to the adjusting cylinder, adapted to operate the piston of the adjusting cylinder when the main air brake cylinder piston moves to a predetermined extent, and flexible mounting for said adjusting cylinder from the car body whereby it is permitted to move with respect to the main air brake cylinder with relative movement between the truck and the car body.

10. In a slack adjuster for railway car brake shoes, a car body, a pair of truck brake beams, a pair of truck brake levers, one operatively connected to each beam, a truck adjusting brake rod, an adjustment therein, a main air brake cylinder connected with the car body and having a piston, mechanical connections from the piston of said main air brake cylinder to the truck brake levers, and automatic air-operated reciprocable means operated in one direction by said main air brake cylinder and flexibly connected with respect thereto for operating the adjustment in said truck adjusting brake rod during retraction of said air-operated means.

11. In a slack adjuster for railway truck brake shoes, a truck brake foundation rigging including brake levers on the same side of the truck, a car body, brake rigging connected therewith and including a main air brake cylinder, a slack adjustment in the truck brake foundation rigging connecting the levers and automatic reciprocatory means, air-actuated in one direction and spring-retracted, operating from the main air brake cylinder for putting into effect the brake adjustment during the retractive movement.

12. In a slack adjuster for railway brake shoes, a truck foundation brake rigging having brake levers on the same side of the truck and an adjustment therebetween, a car body foundation brake rigging operatively connected with the truck foundation brake rigging and including an air brake cylinder and automatic reciprocatory means set for operation by the adjusting cylinder and retracted to adjust, for operating the adjustment in the truck brake foundation rigging during the release movement.

13. In an adjusting mechanism for railway truck brake shoes, a truck foundation brake rigging having a rotary adjustment member therein, a car body foundation brake rigging connected with the truck foundation brake rigging and having a main air brake cylinder therein and a spring-retracted auxiliary take-up air cylinder to set the device by air for spring operated adjustment during retractive movement, and connections flexibly supported with respect to said main air cylinder and in fluid communication therewith at a predetermined point of piston position in said main air cylinder and mechanically connected to operate said rotary brake adjusting member.

14. In an adjusting mechanism for railway truck brake shoes, a truck foundation brake rigging having a rotary adjustment member therein, a car body foundation brake rigging connected with the truck foundation brake rigging and having a main air brake cylinder therein, and an auxiliary take-up air cylinder, piston and connections having spring retraction to effect adjustment, operatively engaging said rotary adjusting member at one end and flexibly connected with respect to said main air cylinder.

15. In an adjusting mechanism for railway truck brake shoes, a truck foundation brake rigging having a rotary adjustment member therein, a car body foundation brake rigging connected with the truck foundation brake rigging and having a main air brake cylinder therein and an auxiliary take-up air cylinder and piston having spring retraction to effect adjustment, operatively connected at one end with said rotary adjusting member and supported from the car body flexibly with respect thereto.

16. A truck brake air-operating mechanism comprising car body foundation brake rigging and truck foundation brake rigging including two brake levers on the same side of the truck having a main air brake operating cylinder in the former and a rotary adjusting member in the latter, connecting both brake levers in combination with an auxiliary air cylinder and piston, having spring retraction to effect adjustment, flexibly connected with and below the main air brake cylinder, in fluid connection with it and operatively connected to turn said rotary adjusting member at predetermined piston positions in the main air brake cylinder.

17. In a slack adjuster for railway car brake shoes, the combination of a car body, a main air cylinder thereon, an adjusting cylinder supported by the car body, a truck, flexible connections between the main air cylinder and the adjusting cylinder, adapted to operate the adjusting cylinder with excessive piston movement of the main cylinder, levers and connections for operating the brake from the main brake cylinder and an adjustment therefor carried by the truck and operated by the adjusting cylinder.

18. In a truck brake adjusting mechanism, a pair of truck brake beams, a pair of truck brake levers operatively connected, one with each beam, a truck adjusting brake rod connecting said levers, completing a truck brake foundation rigging, a ratchet wheel upon said adjusting brake rod, a pair of air cylinder levers operatively connected, one of each pair with one of the pair of truck brake levers, an air brake cylinder tie rod connecting the air cylinder levers, a main air brake cylinder, a piston therefor, the cylinder and piston being connected one with one of the air cylinder levers and the other with the other air cylinder lever, completing a car body foundation brake rigging, an auxiliary air cylinder having a piston and piston rod, adapted to be operated by air from the main air brake cylinder at a predetermined position of the piston therein, a support for said auxiliary cylinder permitting the main air brake cylinder to move with respect to the auxiliary cylinder, flexible air connections between the two cylinders, a latch carried by the piston rod of the auxiliary cylinder, adapted to engage the ratchet wheel, and a spring, compressed by air in the auxiliary cylinder and making the adjustment by its retractive movement.

HUBERT C. BERRY.
GEORGE APPLEGATE.